United States Patent
Lim et al.

(10) Patent No.: US 9,807,736 B2
(45) Date of Patent: Oct. 31, 2017

(54) METHOD AND APPARATUS FOR PERFORMING INITIAL RANGING FOR MACHINE TO MACHINE COMMUNICATION SERVICE IN A MOBILE COMMUNICATION SYSTEM

(75) Inventors: Chi-Woo Lim, Suwon-si (KR);
Hyun-Jeong Kang, Seoul (KR);
Hyun-Kyu Yu, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 14/000,120

(22) PCT Filed: Feb. 17, 2012

(86) PCT No.: PCT/KR2012/001205
§ 371 (c)(1),
(2), (4) Date: Aug. 16, 2013

(87) PCT Pub. No.: WO2012/112001
PCT Pub. Date: Aug. 23, 2012

(65) Prior Publication Data
US 2013/0322408 A1 Dec. 5, 2013

(30) Foreign Application Priority Data
Feb. 18, 2011 (KR) .................. 10-2011-0014630

(51) Int. Cl.
*H04L 5/00* (2006.01)
*H04W 72/04* (2009.01)
(Continued)

(52) U.S. Cl.
CPC ......... *H04W 72/0406* (2013.01); *H04L 5/005* (2013.01); *H04L 5/0092* (2013.01);
(Continued)

(58) Field of Classification Search
None
See application file for complete search history.

(56) References Cited

U.S. PATENT DOCUMENTS

| | | | |
|---|---|---|---|
| 8,737,989 B2 * | 5/2014 | Luft | H04W 4/00 370/338 |
| 2005/0195791 A1 * | 9/2005 | Sung | G01S 13/825 370/342 |

(Continued)

FOREIGN PATENT DOCUMENTS

WO 2011/002241 A2 1/2011

OTHER PUBLICATIONS

E. Karapistoli et al., "An Overview of the IEEE 802.15.4a Standard," IEEE Communications Magazine, pp. 47-53, See "Ranging" (p. 50). Jan. 2010.

(Continued)

*Primary Examiner* — Ayaz Sheikh
*Assistant Examiner* — Tarell Hampton
(74) *Attorney, Agent, or Firm* — Jefferson IP Law, LLP

(57) ABSTRACT

Provided is an INitial ranging (IN) method for a Machine to Machine communication service in a mobile communication system. The IN method includes if the presence of a terminal attempting IN is recognized, determining whether a service the terminal wants to receive is a mobile communication service or a Machine to Machine communication service; and setting an indicator indicating to use Ranging Preamble (RP) code partition information for available in the determined service, and transmitting 'IN-related control information for mobile communication' including the indicator to the terminal.

12 Claims, 2 Drawing Sheets

(51) Int. Cl.
*H04W 4/00* (2009.01)
*H04W 48/08* (2009.01)
*H04L 27/26* (2006.01)

(52) U.S. Cl.
CPC ......... *H04L 27/2613* (2013.01); *H04W 4/005* (2013.01); *H04W 48/08* (2013.01)

(56) References Cited

U.S. PATENT DOCUMENTS

| | | | |
|---|---|---|---|
| 2007/0032255 A1* | 2/2007 | Koo | H04W 56/002 455/512 |
| 2009/0315779 A1* | 12/2009 | Chin et al. | 342/463 |
| 2010/0254433 A1 | 10/2010 | Azizi | |
| 2011/0013720 A1 | 1/2011 | Lee et al. | |
| 2011/0194529 A1* | 8/2011 | Cho et al. | 370/331 |
| 2012/0063305 A1* | 3/2012 | Chiu | H04W 74/0833 370/230 |
| 2013/0040680 A1* | 2/2013 | Kim et al. | 455/509 |

OTHER PUBLICATIONS

C. M. Chen et al., "Cross-Layer Design of Ranging Code Expansion in OFDMA BWA Network," pp. 1254-1259, See section III. Sep. 30, 2010.

\* cited by examiner

[Fig. 1]
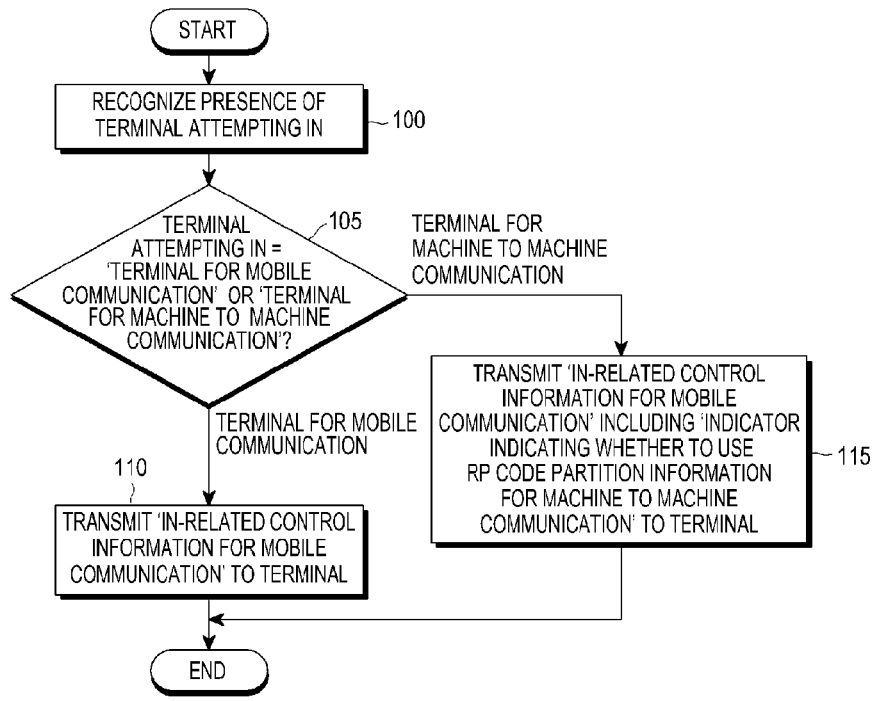
[Fig. 2]
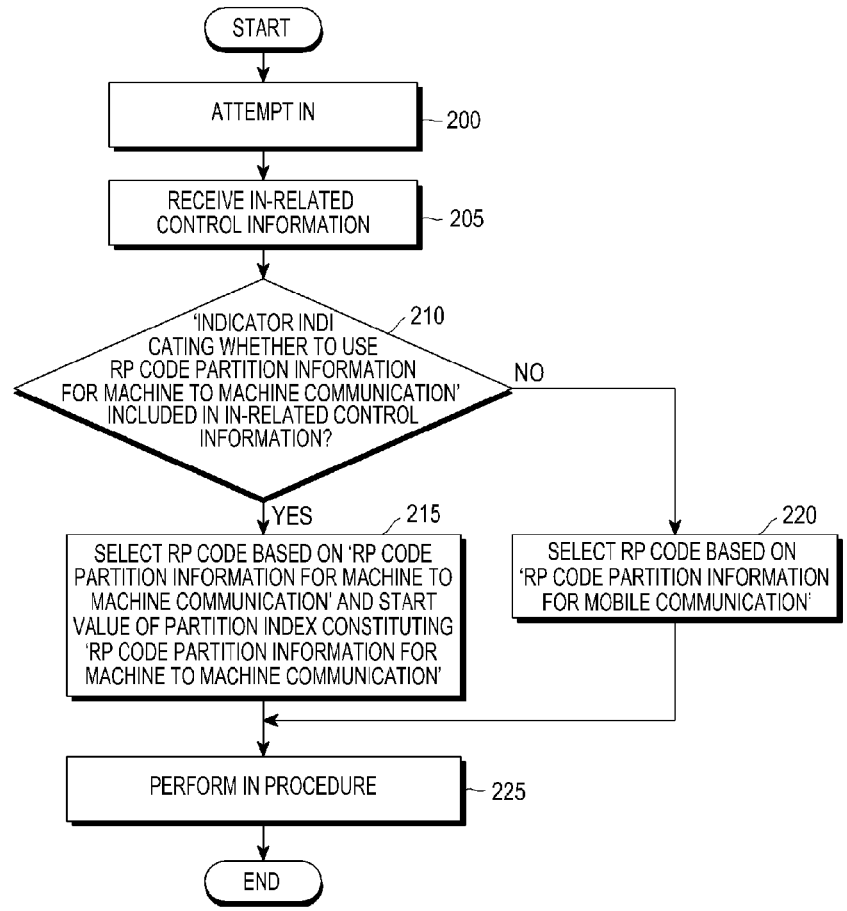

[Fig. 3]
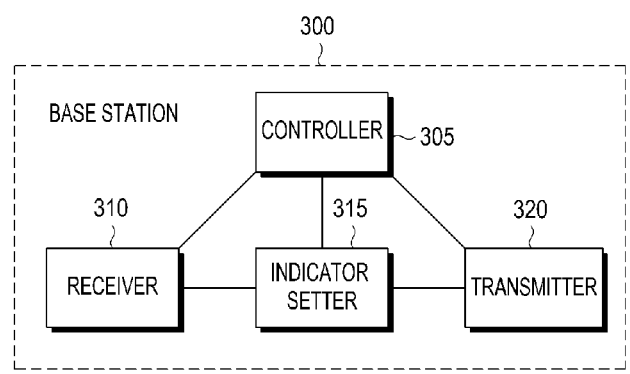
[Fig. 4]
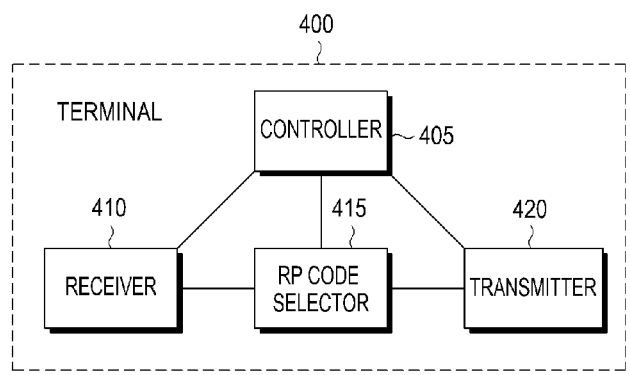

METHOD AND APPARATUS FOR PERFORMING INITIAL RANGING FOR MACHINE TO MACHINE COMMUNICATION SERVICE IN A MOBILE COMMUNICATION SYSTEM

PRIORITY

This application claims the benefit under 35 U.S.C. §119(a) of a Korean Patent Application filed in the Korean Intellectual Property Office on Feb. 18, 2011 and assigned Serial No. 10-2011-0014630, the entire disclosure of which is hereby incorporated by reference.

BACKGROUND OF THE INVENTION

Technical Field

The present invention relates to a method and apparatus for performing INitial ranging (IN) for a Machine to Machine communication service in a mobile communication system.

Background Art

Many studies have been made on a Machine to Machine communication service that supports data communication between devices in a situation where there is no human interaction or only limited control is possible. The Machine to Machine communication service has advantages of reducing the cost of managing devices through automatic control and communications. The Machine to Machine communication service is considered as technology applicable to fleet management of vehicles and goods loaded on the vehicles, smart metering, home automation, health care, etc. In this specification, these devices will be called a 'terminal'.

In a communication system (hereinafter referred to as a 'Machine to Machine communication system') supporting the Machine to Machine communication service, a greater number of terminals will highly likely attempt INitial ranging (IN) at the same time, compared to in the general communication system. Therefore, the Machine to Machine communication system is required to support IN of a larger number of terminals at the same time.

DISCLOSURE OF INVENTION

Technical Problem

Although the Machine to Machine communication system may be independently operated as a new system for supporting the Machine to Machine communication service, the Machine to Machine communication service may be provided by the existing mobile communication system by partially modifying configuration of the existing mobile communication system for the Machine to Machine communication service, thus ensuring significant advantages such as cost savings. Actually, for example, in IEEE 802.16, a new communication system (e.g., 802.16p system) supporting the Machine to Machine communication service has been developed based on a mobile communication system (e.g., 802.16e or 802.16m system). The new communication system is highly likely to provide the Machine to Machine communication service together with the mobile communication service by the same base station. In this case, many problems may occur due to the difference in the IN environment between the existing mobile communication service and the Machine to Machine communication service. Therefore, in order to provide the Machine to Machine communication service in the mobile communication system, there is a need for a novel method and apparatus capable of effectively controlling the different IN environments of the mobile communication service and the Machine to Machine communication service.

Solution to Problem

An aspect of exemplary embodiments of the present invention is to provide a method and apparatus for performing initial ranging for a Machine to Machine communication service in a mobile communication system.

Another aspect of exemplary embodiments of the present invention is to provide a ranging method and apparatus for increasing the number of terminals capable of initial ranging at the same time among the terminals desiring to receive a Machine to Machine communication service in a mobile communication system.

In accordance with one aspect of the present invention, there is provided an INitial ranging (IN) method for a Machine to Machine communication service in a mobile communication system. The IN method includes if the presence of a terminal attempting IN is recognized; determining whether a service the terminal wants to receive is a mobile communication service or a Machine to Machine communication service; setting an indicator indicating to use Ranging Preamble (RP) code partition information available in the determined service and transmitting 'IN-related control information including the indicator to the terminal.

In accordance with another aspect of the present invention, there is provided an INitial ranging (IN) method by a terminal for a Machine to Machine communication service in a mobile communication system. The IN method includes determining whether an 'indicator indicating to use Ranging Preamble (RP) code partition information available in a service wanting to receive by the terminal is set in the IN-related control information; if the indicator is set, selecting an RP code using on the RP code partition information acquired through pre-negotiation with the base station; and performing IN with the base station using the RP code.

In accordance with further another aspect of the present invention, there is provided a base station for performing INitial ranging (IN) for a Machine to Machine communication service in a mobile communication system. The base station includes a receiver for receiving an IN request from a terminal; a controller for determining whether a service the terminal wants to receive is a mobile communication service or a Machine to Machine communication service, and setting an 'indicator indicating to use Ranging Preamble (RP) code partition information; and a transmitter for transmitting 'IN-related control information for mobile communication' including the indicator to the terminal under control of the controller.

In accordance with yet another aspect of the present invention, there is provided a terminal for performing INitial ranging (IN) for a Machine to Machine communication service in a mobile communication system. The terminal includes a transmitter for transmitting an IN request to the terminal; a receiver for receiving IN-related control information from a base station; and a controller for determining whether an indicator indicating to use Ranging Preamble (RP) code partition information available in a service wanting to receive by the terminal wants to receive is set in the IN-related control information, and if the indicator is set, selecting an RP code based on the RP code partition information acquired through pre-negotiation with the base station, and performing IN with the base station using the RP code.

Advantageous Effects of Invention

As is apparent from the forgoing description, according to an exemplary embodiment of the present invention, a mobile communication system supporting a Machine to Machine communication service sets control information that should be provided during initial ranging of terminals desiring to receive the Machine to Machine communication service, based on resources for mobile communication, and transmits the control information to the terminals, making it possible to effectively support Machine to Machine communication without increasing resource allocation overhead, and contributing to an increase in the number of terminals capable of initial ranging at the same time among the terminals desiring to receive the Machine to Machine communication service using the resources for mobile communication.

BRIEF DESCRIPTION OF DRAWINGS

The above and other aspects, features and advantages of certain exemplary embodiments of the present invention will be more apparent from the following description taken in conjunction with the accompanying drawings, in which:

FIG. 1 illustrates an operation of a base station in a mobile communication system according to an embodiment of the present invention;

FIG. 2 illustrates an operation of a terminal for Machine to Machine communication according to an embodiment of the present invention;

FIG. 3 illustrates a structure of a base station in a mobile communication system according to an embodiment of the present invention; and FIG. 4 illustrates a structure of a terminal according to an embodiment of the present invention.

MODE FOR THE INVENTION

Exemplary embodiments of the present invention will now be described in detail with reference to the accompanying drawings. In the following description, descriptions of well-known functions and constructions are omitted for clarity and conciseness.

Generally, in a communication system, a terminal's INitial ranging (IN) procedure is as follows. Specifically, a terminal receives IN-related control information from a base station. The IN-related control information includes information about the amount and location of resources available in IN, an allocation cycle of the resources, and the number of available Ranging Preamble (RP) codes. After receiving the IN-related control information, the terminal arbitrarily selects one of the RP codes acquired based on the information about RP codes, and attempts IN with the base station using the selected RP code. Upon detecting the RP code transmitted from the terminal, the base station allocates resources for IN-related additional information to the terminal, and transmits information about the resources for the IN-related additional information to the terminal. Then, the terminal transmits the IN-related additional information to the base station using the resources corresponding to the IN-related additional information. The IN-related additional information includes uplink transmission timing, transmit power-related information, various information for initial ranging, etc.

As described above, the number of terminals capable of IN attempt to the base station at the same time is determined based on the IN-related control information, i.e., the amount and location of resources available in IN, the allocation cycle of the resources, and the number of available RP codes. Therefore, the number of terminals capable of IN attempt to the base station is limited.

If the amount and location of resources available in IN and the allocation cycle of the resources are increased, overhead and implementation complexity of the entire communication system may increase. Therefore, the present invention provides a method and apparatus for increasing the number of terminals capable of IN attempt by increasing the number of RP codes available in IN. The present invention prevents an increase in complexity which may occur in an RP code detection operation, by partitioning the existing available RP codes without adding new RP codes.

Specifically, an exemplary embodiment of the present invention proposes a method and apparatus for supporting the Machine to Machine communication service based on the existing mobile communication system. In other words, an exemplary embodiment of the present invention proposes RP codes (hereinafter referred to as 'RP codes for Machine to Machine communication') used in an IN procedure between the mobile communication system and terminals (hereinafter referred to as 'terminals for Machine to Machine communication') desiring to receive the Machine to Machine communication service from the mobile communication system. The RP codes for Machine to Machine communication are generated based on all RP codes (hereinafter referred to as 'RP codes for mobile communication') allocable in the mobile communication system. In an exemplary embodiment of the present invention, an 802.16m-based mobile communication system will be considered as an example of the mobile communication system. However, it should be noted that the existing mobile communication system, to which the present invention is applicable, is not necessarily limited to the 802.16m-based mobile communication system.

Table 1 below shows 'RP code partition information for mobile communication' in which the number of RP codes for mobile communication is classified by procedure. The RP codes for mobile communication are partitioned into RP codes used in IN and RP codes used in HandOver (HO).

Referring to Table 1, 'the number $N_{IN}$ of initial RP codes used in IN' and 'the number $N_{HO}$ of handover RP codes used in HO' are mapped to each partition index.

The above-described table showing the 'RP code partition information for mobile communication' may be recognized in advance by 'terminals for Machine to Machine communication' having accessed the mobile communication system, or may be acquired through a negotiation procedure with the mobile communication system.

TABLE 1

| | Partition index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Number of the initial RT codes, $N_{IN}$ | 8 | 8 | 8 | 8 | 16 | 16 | 16 | 16 | 24 | 24 | 24 | 24 | 32 | 32 | 32 | 32 |

TABLE 1-continued

| | Partition index | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| Number of the handover RP codes, $N_{HO}$ | 8 | 16 | 24 | 32 | 8 | 16 | 24 | 32 | 8 | 16 | 24 | 32 | 8 | 16 | 24 | 32 |

The RP codes for Machine to Machine communication, proposed by the present invention, are generated based on RP codes for mobile communication. When the mobile communication system provides the Machine to Machine communication service, the possibility of HO is relatively lower, compared to when the mobile communication system provides the existing mobile communication service only. Therefore, the present invention proposes RP codes for Machine to Machine communication based on the existing RP codes for mobile communication, in which the proportion of RP codes used in the HO procedure reduces while the proportion of RP codes used in the IN procedure increases.

Table 2 below is an example of table showing 'RP code partition information for Machine to Machine communication' in which the number of RP codes for Machine to Machine communication is classified by procedure. The RP codes for Machine to Machine communication are also partitioned into RP codes used in IN and RP codes used in HO.

TABLE 2

| | Partition index | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 | 31 |
| Number of IN RP codes, $N_{IN}$ | 16 | 16 | 24 | 24 | 24 | 32 | 32 | 32 | 32 | 48 | 48 | 48 | 56 | 56 | 60 | 60 |
| Number of HO RP codes $N_{HO}$ | 8 | 16 | 8 | 16 | 24 | 8 | 16 | 24 | 32 | 8 | 16 | 24 | 4 | 8 | 2 | 4 |

Referring to Table 2, 'the number $N_{IN}$ of initial RP codes used in IN' and 'the number $N_{HO}$ of handover RP codes used in HO' are mapped to each partition index. In terms of the number of RP codes used in HO for each partition index, Table 2 is relatively smaller than Table 1.

In other words, when the mobile communication system supports the Machine to Machine communication service, an embodiment of the present invention allows the mobile communication system to further classify some of the RP codes used in HO, a relatively less number of which the mobile communication system needs, compared to when providing only the existing mobile communication service, among the RP codes for mobile communication, as shown in Table 2, so as to use them in IN with the 'terminals for Machine to Machine communication', thereby making it possible to increase the number of RP codes available in IN with the 'terminals for Machine to Machine communication'. It assumed that the above-described table showing 'RP code partition information for Machine to Machine communication' may be recognized in advance by 'terminals for Machine to Machine communication' having accessed the mobile communication system, or may be acquired through a pre-negotiation procedure with the base station.

Upon recognizing (or detecting) an IN attempt from a 'terminal for Machine to Machine communication', the mobile communication system providing the Machine to Machine communication service may transmit additional information representing the 'RP code partition information for Machine to Machine communication' to the 'terminal for Machine to Machine communication' by inserting it into control information (hereinafter referred to as 'IN-related control information for mobile communication') used in the IN procedure of the existing mobile communication service. Otherwise, the 'terminal for Machine to Machine communication' may use the 'RP code partition information for Machine to Machine communication' it has recognized in advance by itself through negotiation with the mobile communication system.

Specifically, the mobile communication system is preset to use resource corresponding to one subband for one subframe in the IN procedure for the mobile communication service. In other words, the 'IN-related control information for mobile communication' includes an allocation cycle of the subband and an index of the subband.

As a specific example, the allocation cycle of the subband is determined based on a value of a subframe offset $O_{SF}$ that is represented by two bits in an "Allocation periodicity of Non-Synchronized Ranging CHannel (NS-RCH)" field which is an allocation cycle field of Non-Synchronized Ranging CHannel (NS-RCH) in Secondary-SubFrame Header (S-SFH) as shown in Table 3 below.

TABLE 3

| Configurations | The AAI subframe allocating the NS-RCH |
|---|---|
| 0 | $O_{SF}^{th}$ UL AAI subframe in every frame |
| 1 | $O_{SF}^{th}$ UL AAI subframe in the first frame in every superframe |
| 2 | $O_{SF}^{th}$ UL AAI subframe in the first frame in every even numbered superframe, i.e., mod(superframe number, 2) = 0 |
| 3 | $O_{SF}^{th}$ UL AAI suframe of the first frame in every $4^{th}$ superframe, i.e. mod(superframe number, 4) = 0 |

An index $I_{SB}$ of the subband is determined by Equation (1) below.

$$I_{SB} = \mathrm{mod}(ID_{cell}, R_{SB}) \qquad (1)$$

where $I_{SB}$ denotes the subband index (0, . . . , $R_{SB}$-1) for ranging resource allocation among $R_{SB}$ subbands.

The 'IN-related control information for mobile communication' may further include a partition index, which is included in the 'RP code partition information for mobile communication' shown in Table 1. The partition index and the number of RP codes, which is mapped to the partition index, are represented as in Table 1 by 4 bits, which are a value of an "RP code partition information for NS-RCH" field which is an RP code partition information field for NS-RCH in SFH.

Referring to Table 1, the mobile communication system allocates a maximum of 32 codes for IN among a total of 64 codes, and allocates the remaining 32 codes for HO. For example, assume that a terminal in an IN procedure has acquired a partition index '13' from the 'IN-related control information for mobile communication' it has received from a base station of the mobile communication system. In this case, the terminal is assumed to have recognized Table 1 in advance through pre-negotiation with the base station. Then, the terminal uses RP codes 0 to 31 corresponding to the partition index '13' in Table 1 during IN, and uses the RP codes 32 to 47 during handover.

In an embodiment of the present invention, upon recognizing an IN attempt of a 'terminal for Machine to Machine communication', the base station of the mobile communication system transmits the 'IN-related control information for mobile communication' to the 'terminal for Machine to Machine communication'. The 'IN-related control information for mobile communication' may further include a separate 1 bit.

Specifically, the base station transmits a 4-bit value of the "RP code partition information for NS-RCH" field in SFH used to transmit 'IN-related control information for mobile communication'.

Upon receiving the 4-bit value, the 'terminal for Machine to Machine communication' selects an RP code it will use in the IN procedure, based on the 'RP code partition information for Machine to Machine communication' the terminal has recognized in advance. The 'terminal for Machine to Machine communication' recognizes a partition index constituting 'RP code partition information for Machine to Machine communication' using Equation (2) below. The 'RP code partition information for Machine to Machine communication' includes partition indexes which are different from those of 'RP code partition information for mobile communication'. For example, Table 2 uses partition indexes 16 to 31, which are different from the partition indexes 0 to 15 used in Table 1. In this case, the 'terminal for Machine to Machine communication' acquires a partition index it will use, by adding an index N it has recognized through pre-negotiation with the base station of the mobile communication system, to a partition index indicated by the 4-bit value.

$$\text{Index} = \text{index of } SFH + N \quad (2)$$

where N denotes a start value of a partition index constituting 'RP code partition information for Machine to Machine communication'.

In an alternative embodiment of the present invention, 1 bit is added to a 4-bit value of the field "RP code partition information for NS-RCH" in SFH. The 1 bit is an indicator indicating whether to use 'RP code partition information for Machine to Machine communication' that the 'terminal for Machine to Machine communication' has recognized in advance.

If the 1 bit is set as '0', the 'terminal for Machine to Machine communication' selects an RP code based on the 'RP code partition information for mobile communication' it has recognized in advance.

On the other hand, if the 1 bit is set as '1', the 'terminal for Machine to Machine communication' selects an RP code based on the 'RP code partition information for Machine to Machine communication' it has recognized in advance, and the start value of the partition index constituting the 'RP code partition information for Machine to Machine communication'. The terminal has acquired the 'RP code partition information for Machine to Machine communication' and the partition index constituting the 'RP code partition information for Machine to Machine communication' through pre-recognition with the base station of the mobile communication system.

FIG. 1 illustrates an operation of a base station in a mobile communication system according to an embodiment of the present invention.

Referring to FIG. 1, the base station recognizes the presence of a terminal attempting IN in step 100. The base station determines in step 105 whether the terminal attempting IN is a 'terminal for mobile communication' or a 'terminal for Machine to Machine communication'. If the terminal attempting IN is a 'terminal for mobile communication', the base station transmits 'IN-related control information for mobile communication' to the terminal in step 110. The 'IN-related control information for mobile communication' represents the generally broadcasted control information.

If the terminal attempting IN is a 'terminal for Machine to Machine communication', the base station transmits 'IN-related control information for mobile communication' including an 'indicator indicating whether to use RP code partition information for Machine to Machine communication' to the terminal in step 115. The 'IN-related control information for mobile communication' is transmitted in the way of including RP code partition information for Machine to Machine communication and N for indicating RP code partition information for another device in the generally broadcasted control information, for example, SFH, as described above.

FIG. 2 illustrates an operation of a terminal for Machine to Machine communication according to an embodiment of the present invention.

Referring to FIG. 2, the terminal attempts IN to a base station in step 200, and receives IN-related control information from the terminal in step 205.

In step 210, the terminal determines whether an 'indicator indicating whether to use RP code partition information for Machine to Machine communication' is set in the received IN-related control information. If the 'indicator indicating whether to use RP code partition information for Machine to Machine communication' is set, the terminal selects an RP code based on the 'RP code partition information for Machine to Machine communication' it has recognized in advance, and a start value of a partition index constituting the 'RP code partition information for Machine to Machine communication' in step 215.

If the 'indicator indicating whether to use RP code partition information for Machine to Machine communication' is not set, the terminal selects an RP code based on the 'RP code partition information for Machine to Machine communication' in step 220.

In step 225, the terminal performs an IN procedure with the base station using the selected RP code.

FIG. 3 illustrates a structure of a base station in a mobile communication system according to an embodiment of the present invention.

Referring to FIG. 3, the base station 300 includes a controller 305, a receiver 310, an indicator setter 315, and a transmitter 320.

The receiver 310 receives an IN request from a terminal. Then, the controller 305 determines whether the terminal is a 'terminal for mobile communication' or a 'terminal for Machine to Machine communication'. If the terminal having attempted IN is a 'terminal for mobile communication', the controller 305 controls the transmitter 320 to transmit IN-related control information for mobile communication to the terminal.

However, if the terminal having attempted IN is a 'terminal for Machine to Machine communication', the controller 305 controls the indicator setter 315 to set an 'indicator indicating whether to use RP code partition information for Machine to Machine communication' to indicate use of RP code partition information for Machine to Machine communication, and controls the transmitter 320 to transmit 'IN-related control information for mobile communication' including the set indicator to the terminal.

The transmitter 320 transmits the 'IN-related control information for mobile communication' including or not including the set indicator to the terminal under control of the controller 305.

FIG. 4 illustrates a structure of a terminal according to an embodiment of the present invention.

Referring to FIG. 4, the terminal 400 includes a controller 405, a receiver 410, an RP code selector 415, and a transmitter 420.

The transmitter 420 transmits an IN request, and the receiver 410 receives IN-related control information in response thereto. The controller 405 determines whether an 'indicator indicating whether to use RP code partition information for Machine to Machine communication' is set in the received IN-related control information. If the 'indicator indicating whether to use RP code partition information for Machine to Machine communication' is set, the controller 405 controls the RP code selector 415 to select an RP code based on the 'RP code partition information for Machine to Machine communication' it has recognized in advance, and a start value of a partition index constituting the 'RP code partition information for Machine to Machine communication'.

However, if the 'indicator indicating whether to use RP code partition information for Machine to Machine communication' is not set, the controller 405 controls the RP code selector 415 to an RP code based on the 'RP code partition information for mobile communication'.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. An initial ranging method for a machine to machine communication service by a base station in a mobile communication system, the method comprising:
   detecting initial ranging of a terminal for the machine to machine communication service;
   generating resource information allocated for the initial ranging, the resource information comprising an indicator indicating whether to use a first resource configuration for a mobile communication or a second resource configuration for a machine to machine communication, and a start value of indexes of resource partition configurations in the second resource configuration, each of the first resource configuration and the second resource configuration comprising a plurality of resource partition configurations between an initial ranging resource and a handover resource with consecutive indexes; and
   transmitting, to the terminal, the resource information.

2. The method of claim 1, wherein the initial ranging resource is configured as a resource except the handover resource within resources allocated to the mobile communication system.

3. An initial ranging method by a terminal for a machine to machine communication service in a mobile communication system, the method comprising:
   transmitting, to a base station, a request of the initial ranging for the machine to machine communication service;
   receiving, from the base station, resource information allocated for the initial ranging, the resource information comprising an indicator indicating whether to use a first resource configuration for a mobile communication or a second resource configuration for a machine to machine communication, and a start value of indexes of resource partition configurations in the second resource configuration, each of the first resource configuration and the second resource configuration comprising a plurality of resource partition configurations between an initial ranging resource and a handover resource with consecutive indexes;
   identifying the indicator from the resource information;
   selecting a resource for the initial ranging based on the indicator and the start value; and
   performing the initial ranging with the base station using the selected resource.

4. The method of claim 3,
   wherein the initial ranging resource is configured as a resource except the handover resource within the resources allocated to the mobile communication system.

5. A base station for performing initial ranging for a machine to machine communication service by a base station in a mobile communication system, the base station comprising:
   a controller configured to:
      detect initial ranging of a terminal for the machine to machine communication service, and
      generate resource information allocated for the initial ranging, the resource information comprising an indicator indicating whether to use a first resource configuration for a mobile communication or a second resource configuration for a machine to machine communication, and a start value of indexes of resource partition configurations in the second resource configuration, each of the first resource configuration and the second resource configuration comprising a plurality of resource partition configurations between an initial ranging resource and a handover resource with consecutive indexes; and
   a transceiver configured to transmit, to the terminal, the resource information.

6. The base station of claim 5, wherein the initial ranging resource is configured as a resource except the handover resource within the resources allocated to the mobile communication system.

7. A terminal for performing initial ranging for a machine to machine communication service in a mobile communication system, the terminal comprising:
   a transmitter configured to transmit a request of the initial ranging for the machine to machine communication service to a base station;
   a receiver configured to receive, from the base station, resource information allocated for the initial ranging, the resource information comprising an indicator indicating whether to use a first resource configuration for a mobile communication or a second resource configuration for a machine to machine communication, and a start value of indexes of resource partition configurations in the second resource configuration, each of the first resource configuration and the second resource configuration comprising a plurality of resource partition configurations between an initial ranging resource and a handover resource with consecutive indexes; and a controller configured to:
  identify the indicator from the resource information,
  select a resource for the initial ranging based on the indicator and the start value, and
  perform the initial ranging with the base station using the selected resource.

8. The terminal of claim 7,
wherein the initial ranging resource is configured as a resource except the handover resource within the resources allocated to the mobile communication system.

9. The method of claim 1, wherein the initial ranging resource is allocated except the handover resource within resources allocated to the mobile communication system.

10. The method of claim 3, wherein the initial ranging resource is allocated except the handover resource within resources allocated to the mobile communication system.

11. The base station of claim 5, wherein the initial ranging resource is allocated except the handover resource within resources allocated to the mobile communication system.

12. The terminal of claim 7, wherein the initial ranging resource is allocated except the handover resource within resources allocated to the mobile communication system.

* * * * *